US007233669B2

(12) United States Patent
Candelore

(10) Patent No.: US 7,233,669 B2
(45) Date of Patent: *Jun. 19, 2007

(54) SELECTIVE ENCRYPTION TO ENABLE MULTIPLE DECRYPTION KEYS

(75) Inventor: Brant L. Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 779 days.

This patent is subject to a terminal disclaimer.

(21) Appl. No.: 10/319,169

(22) Filed: Dec. 13, 2002

(65) Prior Publication Data

US 2003/0159140 A1 Aug. 21, 2003

Related U.S. Application Data

(63) Continuation-in-part of application No. 10/038,217, filed on Jan. 2, 2002, and a continuation-in-part of application No. 10/038,032, filed on Jan. 2, 2002, and a continuation-in-part of application No. 10/037,914, filed on Jan. 2, 2002, and a continuation-in-part of application No. 10/037,499, filed on Jan. 2, 2002, and a continuation-in-part of application No. 10/037,498, filed on Jan. 2, 2002.

(60) Provisional application No. 60/409,675, filed on Sep. 9, 2002.

(51) Int. Cl.
*H04N 7/167* (2006.01)

(52) U.S. Cl. .................. 380/210; 380/200; 380/201

(58) Field of Classification Search ........ 380/200–203, 380/212, 231–233, 278, 284, 239, 42, 44, 380/37, 241, 217, 218; 713/150, 160–163, 713/168, 170, 176, 178, 193, 189; 705/50–59; 725/25–31, 87, 91, 100, 101, 103; 709/225, 709/229

See application file for complete search history.

(56) References Cited

U.S. PATENT DOCUMENTS 3,852,519 A 12/1974 Court (Continued)

FOREIGN PATENT DOCUMENTS

EP 0471373 2/1992

(Continued)

OTHER PUBLICATIONS

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

(Continued)

*Primary Examiner*—Kim Vu
*Assistant Examiner*—Nirav Patel
(74) *Attorney, Agent, or Firm*—Miller Patent Services; Jerry A. Miller

(57) ABSTRACT

A selective encryption method and apparatus consistent with the invention duplicates selected packets in a file or data stream and multiple encrypts the packets using multiple encryption keys. Each encryption key is valid for a specific segment of time so that changes in entitlement keys used for decryption can be made without negatively impacting a customer's ability to access content that has been paid for.

44 Claims, 6 Drawing Sheets

U.S. PATENT DOCUMENTS

| | | |
|---|---|---|
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata et al. |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,528,608 A | 6/1996 | Shimizume |
| 5,535,276 A | 7/1996 | Ganesan |
| 5,539,823 A | 7/1996 | Martin et al. |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Dillon et al. |
| 5,663,764 A | 9/1997 | Kondo et al. |
| 5,666,293 A | 9/1997 | Metz et al. |
| 5,699,429 A * | 12/1997 | Tamer et al. ............... 380/212 |
| 5,703,889 A | 12/1997 | Shimoda et al. |
| 5,717,814 A | 2/1998 | Abecassis |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasilewski et al. |
| 5,894,320 A | 4/1999 | Vancelette |
| 5,894,516 A | 4/1999 | Brandenburg |
| 5,915,018 A | 6/1999 | Aucsmith |
| 5,922,048 A | 7/1999 | Emura |
| 5,923,755 A | 7/1999 | Birch et al. |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,973,679 A | 10/1999 | Abbott et al. |
| 5,973,722 A | 10/1999 | Wakai et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,021,199 A | 2/2000 | Ishibashi |
| 6,021,201 A | 2/2000 | Bakhle et al. |
| 6,026,164 A | 2/2000 | Sakamoto et al. |
| 6,028,932 A | 2/2000 | Park |
| 6,049,613 A | 4/2000 | Jakobsson |
| 6,055,314 A | 4/2000 | Spies et al. |
| 6,055,315 A | 4/2000 | Doyle et al. |

| | | |
|---|---|---|
| 6,057,872 A | 5/2000 | Candelore |
| 6,058,186 A | 5/2000 | Enari |
| 6,058,192 A | 5/2000 | Guralnick et al. |
| 6,061,451 A | 5/2000 | Muratani et al. |
| 6,064,748 A | 5/2000 | Hogan |
| 6,065,050 A | 5/2000 | DeMoney |
| 6,069,647 A | 5/2000 | Sullivan et al. |
| 6,070,245 A | 5/2000 | Murphy, Jr. et al. |
| 6,072,872 A | 6/2000 | Chang et al. |
| 6,072,873 A | 6/2000 | Bewick |
| 6,073,122 A | 6/2000 | Wool |
| 6,088,450 A | 7/2000 | Davis et al. |
| 6,105,134 A | 8/2000 | Pinder et al. |
| 6,108,422 A | 8/2000 | Newby et al. |
| 6,115,821 A | 9/2000 | Newby et al. |
| 6,118,873 A | 9/2000 | Lotspiech et al. |
| 6,134,551 A | 10/2000 | Aucsmith |
| 6,138,237 A | 10/2000 | Ruben et al. |
| 6,148,082 A | 11/2000 | Slattery et al. |
| 6,154,206 A | 11/2000 | Ludtke |
| 6,157,719 A | 12/2000 | Wasilewski et al. |
| 6,181,334 B1 | 1/2001 | Freeman et al. |
| 6,185,369 B1 | 2/2001 | Ko et al. |
| 6,185,546 B1 | 2/2001 | Davis |
| 6,189,096 B1 | 2/2001 | Haverty |
| 6,192,131 B1 | 2/2001 | Geer et al. |
| 6,199,053 B1 | 3/2001 | Herbert et al. |
| 6,204,843 B1 | 3/2001 | Freeman et al. |
| 6,209,098 B1 | 3/2001 | Davis |
| 6,215,484 B1 | 4/2001 | Freeman et al. |
| 6,226,618 B1 | 5/2001 | Downs et al. |
| 6,229,895 B1 | 5/2001 | Son et al. |
| 6,230,194 B1 | 5/2001 | Frailong et al. |
| 6,230,266 B1 | 5/2001 | Perlman et al. |
| 6,236,727 B1 | 5/2001 | Ciacelli et al. |
| 6,240,553 B1 | 5/2001 | Son et al. |
| 6,246,720 B1 | 6/2001 | Kutner et al. |
| 6,256,747 B1 | 7/2001 | Inohara et al. |
| 6,263,506 B1 | 7/2001 | Ezaki et al. |
| 6,266,416 B1 | 7/2001 | Sigbjornsen et al. |
| 6,266,480 B1 | 7/2001 | Ezaki et al. |
| 6,272,538 B1 | 8/2001 | Holden et al. |
| 6,278,783 B1 | 8/2001 | Kocher et al. |
| 6,289,455 B1 | 9/2001 | Kocher et al. |
| 6,292,568 B1 | 9/2001 | Akins, III et al. |
| 6,292,892 B1 | 9/2001 | Davis |
| 6,307,939 B1 | 10/2001 | Vigarie |
| 6,311,012 B1 | 10/2001 | Cho et al. |
| 6,324,288 B1 | 11/2001 | Hoffman |
| 6,351,538 B1 | 2/2002 | Uz |
| 6,378,130 B1 | 4/2002 | Adams |
| 6,389,533 B1 | 5/2002 | Davis et al. |
| 6,389,537 B1 | 5/2002 | Davis et al. |
| 6,415,031 B1 * | 7/2002 | Colligan et al. ............ 380/200 |
| 6,415,101 B1 | 7/2002 | deCarmo et al. |
| 6,430,361 B2 | 8/2002 | Lee |
| 6,445,738 B1 | 9/2002 | Zdepski et al. |
| 6,449,718 B1 | 9/2002 | Rucklidge et al. |
| 6,453,115 B1 | 9/2002 | Boyle |
| 6,456,985 B1 | 9/2002 | Ohtsuka |
| 6,459,427 B1 | 10/2002 | Mao et al. |
| 6,463,152 B1 | 10/2002 | Takahashi |
| 6,466,671 B1 | 10/2002 | Maillard et al. |
| 6,505,032 B1 | 1/2003 | McCorkle et al. |
| 6,505,299 B1 | 1/2003 | Zeng et al. |
| 6,510,554 B1 | 1/2003 | Gorden et al. |
| 6,519,693 B1 | 2/2003 | Debey |
| 6,529,526 B1 | 3/2003 | Schneidewend |
| 6,543,053 B1 | 4/2003 | Li et al. |
| 6,549,229 B1 | 4/2003 | Kirby et al. |
| 6,557,031 B1 | 4/2003 | Mimura et al. |
| 6,587,561 B1 | 7/2003 | Sered et al. |
| 6,640,145 B2 | 10/2003 | Hoffberg et al. |
| 6,650,754 B2 * | 11/2003 | Akiyama et al. ........... 380/278 |
| 6,654,389 B1 | 11/2003 | Brunheroto et al. |
| 6,678,740 B1 | 1/2004 | Rakib et al. |
| 6,681,326 B2 * | 1/2004 | Son et al. .................... 713/150 |
| 6,684,250 B2 | 1/2004 | Anderson et al. |
| 6,697,944 B1 | 2/2004 | Jones et al. |
| 6,754,276 B1 | 6/2004 | Harumoto et al. |
| 6,772,340 B1 | 8/2004 | Peinado et al. |
| 6,788,690 B2 | 9/2004 | Harri |
| 6,826,185 B1 | 11/2004 | Montanaro et al. |
| 6,891,565 B1 | 5/2005 | Dieterich |
| 6,904,520 B1 | 6/2005 | Rosset et al. |
| 6,917,684 B1 * | 7/2005 | Tatebayashi et al. .......... 380/44 |
| 6,938,162 B1 * | 8/2005 | Nagai et al. ................. 713/189 |
| 6,976,166 B2 | 12/2005 | Herley et al. |
| 7,039,938 B2 * | 5/2006 | Candelore .................... 725/87 |
| 7,127,619 B2 * | 10/2006 | Unger et al. ................. 713/193 |
| 2001/0030959 A1 | 10/2001 | Ozawa et al. |
| 2002/0026587 A1 | 2/2002 | Talstra et al. |
| 2002/0046406 A1 | 4/2002 | Chelehmal et al. |
| 2002/0047915 A1 | 4/2002 | Misu |
| 2002/0059425 A1 | 5/2002 | Belfiore et al. |
| 2002/0083317 A1 | 6/2002 | Ohta et al. |
| 2002/0083438 A1 * | 6/2002 | So et al. ....................... 725/31 |
| 2002/0097322 A1 | 7/2002 | Monroe et al. |
| 2002/0108035 A1 | 8/2002 | Herley et al. |
| 2002/0129243 A1 | 9/2002 | Nanjundiah |
| 2002/0150239 A1 | 10/2002 | Carny et al. |
| 2002/0164022 A1 * | 11/2002 | Strasser et al. ............. 380/201 |
| 2002/0170053 A1 | 11/2002 | Peterka et al. |
| 2002/0184506 A1 | 12/2002 | Perlman |
| 2002/0194613 A1 | 12/2002 | Unger |
| 2002/0196939 A1 | 12/2002 | Unger et al. |
| 2003/0002854 A1 | 1/2003 | Belknap et al. |
| 2003/0009669 A1 * | 1/2003 | White et al. ................. 713/176 |
| 2003/0012286 A1 | 1/2003 | Ishtiaq et al. |
| 2003/0021412 A1 | 1/2003 | Candelore et al. |
| 2003/0026423 A1 | 2/2003 | Unger et al. |
| 2003/0046686 A1 | 3/2003 | Candelore et al. |
| 2003/0063615 A1 | 4/2003 | Luoma et al. |
| 2003/0072555 A1 | 4/2003 | Yap et al. |
| 2003/0077071 A1 | 4/2003 | Lin et al. |
| 2003/0081630 A1 | 5/2003 | Mowery et al. |
| 2003/0081776 A1 | 5/2003 | Candelore |
| 2003/0084284 A1 | 5/2003 | Ando et al. |
| 2003/0097662 A1 | 5/2003 | Russ et al. |
| 2003/0112333 A1 | 6/2003 | Chen et al. |
| 2003/0118243 A1 | 6/2003 | Sezer et al. |
| 2003/0123664 A1 | 7/2003 | Pedlow, Jr. et al. |
| 2003/0123849 A1 | 7/2003 | Nallur et al. |
| 2003/0126086 A1 | 7/2003 | Safadi |
| 2003/0133570 A1 | 7/2003 | Candelore et al. |
| 2003/0140257 A1 | 7/2003 | Peterka et al. |
| 2003/0145329 A1 | 7/2003 | Candelore |
| 2003/0152224 A1 | 8/2003 | Candelore et al. |
| 2003/0152226 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0174837 A1 | 9/2003 | Candelore et al. |
| 2003/0188154 A1 | 10/2003 | Dallard |
| 2003/0193973 A1 | 10/2003 | Takashimizu et al. |
| 2003/0198223 A1 | 10/2003 | Mack et al. |
| 2003/0204717 A1 | 10/2003 | Kuehnel |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0028227 A1 | 2/2004 | Yu |
| 2004/0047470 A1 | 3/2004 | Candelore |
| 2004/0049688 A1 | 3/2004 | Candelore |
| 2004/0049690 A1 | 3/2004 | Candelore et al. |

| | | | |
|---|---|---|---|
| 2004/0049691 | A1 | 3/2004 | Candelore et al. |
| 2004/0049694 | A1 | 3/2004 | Candelore |
| 2004/0068659 | A1 | 4/2004 | Diehl |
| 2004/0078575 | A1 | 4/2004 | Morten et al. |
| 2004/0081333 | A1 | 4/2004 | Grab et al. |
| 2004/0091109 | A1 | 5/2004 | Son et al. |
| 2004/0123094 | A1 | 6/2004 | Sprunk |
| 2004/0139337 | A1 | 7/2004 | Pinder et al. |
| 2004/0165586 | A1 | 8/2004 | Read et al. |
| 2004/0187161 | A1 | 9/2004 | Cao |
| 2004/0193550 | A1 | 9/2004 | Siegal |
| 2005/0004875 | A1 | 1/2005 | Kontio et al. |
| 2005/0071669 | A1 | 3/2005 | Medvinsky et al. |
| 2005/0169473 | A1 | 8/2005 | Candelore |
| 2005/0192904 | A1 | 9/2005 | Candelore |
| 2005/0259813 | A1 | 11/2005 | Wasilewski et al. |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0833517 | 4/1998 |
| EP | 0866615 | 9/1998 |
| EP | 1 187 483 A2 | 3/2002 |
| EP | 1187483 | 3/2002 |
| JP | 7067028 | 3/1995 |
| JP | 11243534 | 10/2002 |
| WO | WO 86/07224 | 12/1986 |
| WO | WO 94/10775 | 5/1994 |
| WO | WO 97/38530 | 10/1997 |
| WO | WO 00/31964 | 6/2000 |
| WO | WO 01/78386 | 10/2001 |
| WO | WO 01/78386 A2 | 10/2001 |

OTHER PUBLICATIONS

Kunkelmann T. et al., A scalable security architecture for multimedia communication standards, Darmstadt Univ. of Technology, ITO, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

Liu, et al. Motion Vector Encryption in Multimedia Streaming, 2004, IEEE, pp. 64-71.

"How Networks Work—Milennium Edition"—pp. 88-89, Que Corporation, 2000.

"Performance Study of a Selective Encryption Scheme for the Security of Networked, Real-Time Video" by Spanos and Maples, pp. 2-10, 1995, IEEE.

"An Empirical Study of Secure MPEG Video Transmissions" by Agi and Gong, pp. 137-144, 1996, IEEE, Proceedings of SNDSS '96.

"Selective Encryption and Watermarking of MPEG Video (Extended Abstract)" by Wu and Wu, Feb. 17, 1997, submitted to International Conference on Image Science, Systems, and Technology, CISST'97.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"DVD Demystified—The Guidebook for DVD-Video and DVD-ROM" by Jim Taylor, Pub. McGraw-Hill, 1998, ISBN: 0-07-064841-7, pp. 134-147.

"An Efficient MPEG Video Encryption Algorithm" by Shi and Bhargava, pp. 381-386, 1998 IEEE.

"Multimedia and Security Workshop at ACM Multimedia" '98. Bristol, U.K., Sep. 1998.

"Comparison of MPEG Encryption Algorithms" by Qiao and Nahrstedt, Jan. 17, 1998, Preprint submitted to Elsevier Science.

"Applying Encryption to Video Communication" by Kunkelmann, pp. 41-47, Sep. 1998, Multimedia and Security Workshop at ACM Multimedia '98. Bristol, U.K.

"Evaluation of Selective Encryption Techniques for Secure Transmission of MPEG-Compressed Bit-Streams" by Alattar and Al-Regib, pp. IV-340 to IV-343, 1999, IEEE.

"Improved Selective Encryption Techniques for Secure Transmission of MPEG Video Bit-Streams" by Alattar, Al-Regib and Al-Semari, pp. 256-260, 1999, IEEE.

"Efficient Frequency Domain Video Scrambling for Content Access Control" by Zeng and Lei, Nov. 1999, In Proc. ACM Multimedia.

"Transport Streams Insertion of Video in the Compressed Digital Domain" by SeaChange International, Web Site Literature, 2000.

"A Report on Security Issues in Multimedia" by Gulwani, Apr. 30, 2000, Course Notes, Department of Computer Science and Engineering, Indian Institute of Technology Kanpur.

"Fast Encryption Methods for Audiovisual Data Confidentiality" by Wu and Kuo, Nov. 2000, SPIE International Symposia on Information Technologies 2000, (Boston, Ma., USA).

"Visible World—A High Impact Approach to Customized Television Advertising" by Haberman, Dec. 2001.

"Ad Agencies and Advertisers To Be Empowered with Targeted Ads Delivered by Television's Prevailing Video Servers" Article Business Section of The New York Times, Updated Thursday, Dec. 20, 2001.

"Pre-Encryption Profiles—Concept Overview and Proposal", Rev. 1.2 as submitted to the Open CAS consortium on Dec. 28, 2000.

"Dynamic-Customized TV Advertising Creation and Production Tools" by SeaChange International, Web Site Literature.

Anonymous, Message Authentication with Partial Encryption, Research disclosure RD 296086, Dec. 10, 1988.

Anonymous, New Digital Copy Protection Proposal Would Secure Authorized Copies, PR Newswire, Nov. 1998, pp. 1-3.

"A Report on Security Issues in Multimedia" by Gulwani, pp. 10-14, Apr. 30, 2000, Course Notes, Department of Computer Science and Engineering, Indian Institute of Technology Kanpur.

"Coral Consortium Aims to Make DRM Interoperable", by Bill Rosenblatt, Oct. 7, 2004, online at http://www.drmwatch.com/standards/article.php/3418741.

Metro Media™ PVR-DVD-MP3-Web—Internet publication from www.metrolink.com, undated.

"Passage™, Freedom to Choose", 2003, Sony Electronics Inc.

"The Long March to Interoperable Digital Rights Management" by Koenen et al., pp. 1-17, 2004, IEEE.

Aravind, H. , et al., "Image and Video Coding Standards", AT&T Technical Journal, (Jan./Feb. 1993),67-68.

Gonzalez, R. C., et al., "Digital Image Processing", Addison Wesley Publishing Company, Inc., (1992),346-348.

Kim, et al., "Bit Rate Reduction Algorithm for Digital VCR", IEEE Transactions on Consumer Electronics, vol. 37, No. 3, (Aug. 1, 1992),267-274.

Kondo, et al., "A New Concealment Method for Digital VCRs", IEEE Visual Signal Processing and Communication, Melbourne, Australia,(Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", Sony Corporation, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993),704-709.

Robert et al., "Digital Cable: The Key to Your Content", Access Intelligence's Cable Group, Feb. 2002, online at http:www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY,(Jun. 3, 1993).

"ClearPlay: The Technology of Choice", from web site, Clear Play 2001-2003.

* cited by examiner ary embodiments of the invention, taken in conjunction
SELECTIVE ENCRYPTION TO ENABLE MULTIPLE DECRYPTION KEYS

CROSS REFERENCE TO RELATED DOCUMENTS

This application is a continuation-in-part of patent applications SNY-R4646.01 entitled "Critical Packet Partial Encryption" to Unger et al, Ser. No. 10/038,217; patent applications SNY-R4646.02 entitled "Time Division Partial Encryption" to Candelore et al., Ser. No. 10/038,032; SNY-R4646.03 entitled "Elementary Stream Partial Encryption" to Candelore, Ser. No. 10/037,914; SNY-R4646.04 entitled "Partial Encryption and PID Mapping" to Unger et al., Ser. No. 10/037,499; and SNY-R4646.05 entitled "Decoding and Decrypting of Partially Encrypted Information" to Unger et al., Ser. No. 10/037,498 all of which were filed on Jan. 2, 2002 and are hereby incorporated by reference herein.

This application is also related to U.S. patent applications Ser. No. 10/273,905, filed Oct. 18, 2002 to Candelore et al., entitled "Video Slice and Active Region Based Dual Partial Encryption", SNY-R4854.01; Ser. No. 10/273,903, filed Oct. 18, 2002 to Candelore et al., entitled "Star Pattern Partial Encryption", SNY-S5064.01; Ser. No. 10/274,084, filed Oct. 18, 2002 to Candelore et al., entitled "Slice Mask and Moat Pattern Partial Encryption", and SNY-S5065.01; Ser. No. 10/274,019, filed Oct. 18, 2002 to Candelore et al., entitled "Video Scene Change Detection", SNY-S5162.01, which are hereby incorporated by reference.

This application is also related to and claims priority benefit of U.S. Provisional patent application Ser. No. 60/409,675, filed Sep. 9, 2002, 50S5152, entitled "Generic PID Remapping for Content Replacement", to Candelore. These applications are also hereby incorporated by reference herein.

FIELD OF THE INVENTION

This invention relates generally to the field of encryption of digital video content. More particularly, this invention relates to use of multiple selective encryption using multiple entitlement keys to enable extending the life of program content with a limited playback life.

BACKGROUND OF THE INVENTION

Many conditional access (CA) systems deliver entitlement keys to subscribers or purchasers of content on a regular basis, commonly on a monthly basis. Such entitlement keys permit the purchaser to access content during the month that the key is valid. Content encrypted with this month's key generally cannot be accessed by next month's entitlement key. Consequently content can "age" and not be accessible. For example, if content is purchased for a one month period (i.e., the purchaser is entitled to access the content for one month) on July 15, and if new keys are automatically distributed on August 1, the purchaser's content may become inaccessible after the new keys are distributed. Thus, in order to fulfill the obligation of the provider to enable the purchaser to view the content after August 1, a new copy of the content is supplied encrypted under the new entitlement key. This, of course, means that the content is downloaded to the purchaser twice with the disadvantage of using double the bandwidth, and potentially providing an inconvenience to the customer and the content provider.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
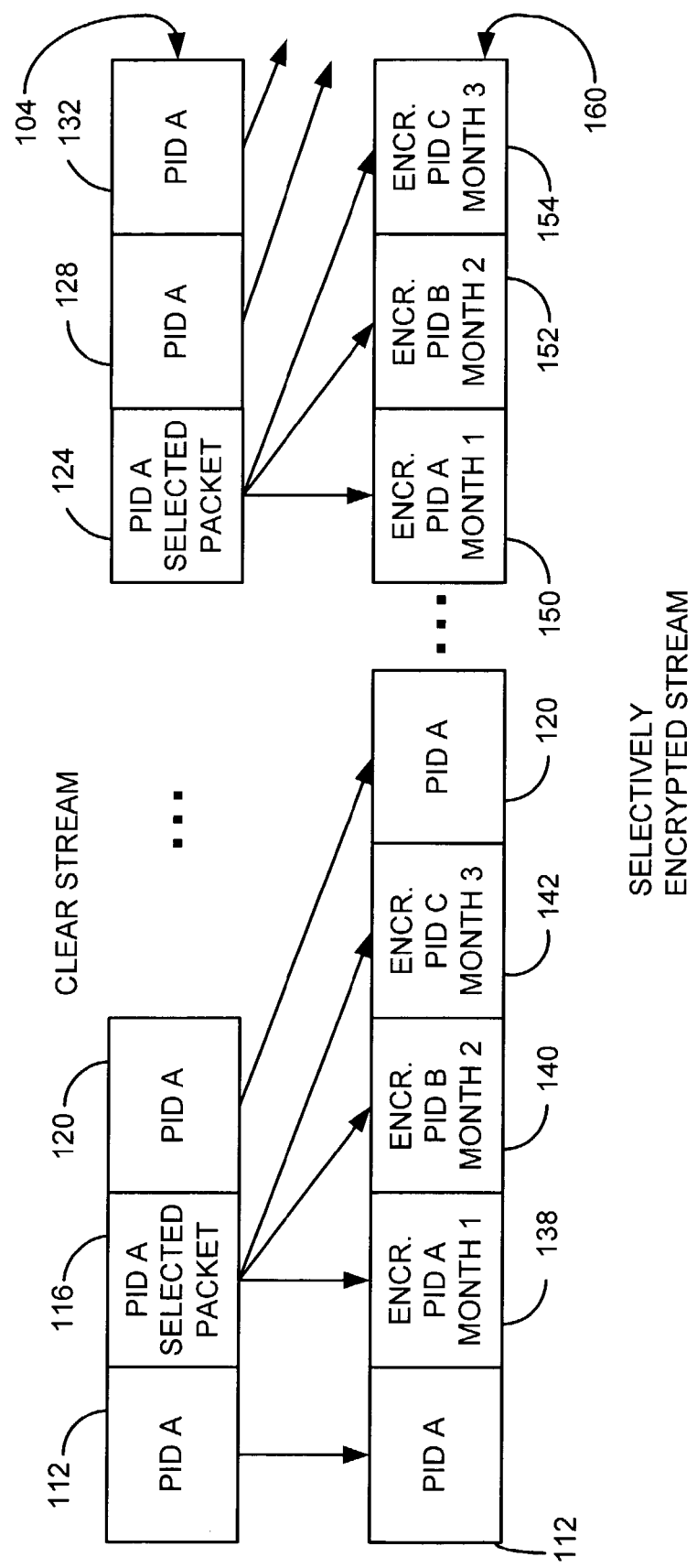
FIG. 1 illustrates a selectively encrypted data stream consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. The term "video" may be used herein to embrace not only true visual information, but also in the conversational sense (e.g., "video tape recorder") to embrace not only video signals but associated audio and data. The present document generally uses the example of a "dual selective encryption" embodiment, but those skilled in the art will recognize that the present invention can be utilized to realize multiple partial encryption without departing from the invention. The terms "partial encryption" and "selective encryption" are used synonymously herein. Also, the terms "program" and "television program" and similar terms can be interpreted in the normal conversational sense, as well as a meaning wherein the term means any segment of A/V content that can be displayed on a television set or similar monitor device. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The present document generally uses the example of a "dual partial encryption" embodiment, but those skilled in the art will recognize that the present invention can be utilized to realize multiple partial encryption without departing from the invention.

The above-referenced commonly owned patent applications describe inventions relating to various aspects of methods generally referred to herein as partial encryption or selective encryption. More particularly, systems are described wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

The present invention applies similar selective encryption techniques to the problem of enabling trick play with encrypted digital video content. The partial encryption processes described in the above patent applications utilize any suitable encryption method. However, these encryption techniques are selectively applied to the data stream, rather than encrypting the entire data stream, using techniques described in the above-referenced patent applications. In general, but without the intent to be limiting, the selective encryption process utilizes intelligent selection of information to encrypt so that the entire program does not have to undergo dual encryption. By appropriate selection of data to encrypt, the program material can be effectively scrambled and hidden from those who desire to hack into the system and illegally recover commercial content without paying. MPEG (or similar format) data that are used to represent the audio and video data does so using a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data. Thus, encryption of this anchor data, for example, or other key data can effectively render the video un-viewable.

In accordance with certain embodiments consistent with the present invention, the selected video data to be encrypted may be any individual one or combination of the following (described in greater detail in the above applications): video slice headers appearing in an active region of a video frame, data representing an active region of a video frame, data in a star pattern within the video frame, data representing scene changes, I Frame packets, packets containing motion vectors in a first P frame following an I Frame, packets having an intra_slice_flag indicator set, packets having an intra_slice indicator set, packets containing an intra_coded macroblock, data for a slice containing an intra_coded macroblock, data from a first macroblock following the video slice header, packets containing video slice headers, anchor data, and P Frame data for progressively refreshed video data, data arranged in vertical and or horizontal moat patterns on the video frame, and any other selected data that renders the video and/or audio difficult to utilize. Several such techniques as well as others are disclosed in the above-referenced patent applications, any of which (or other techniques) can be utilized with the present invention to encrypt only a portion of the content.

In the above-referenced patent applications, selective encryption (SE) is used to provide a mechanism to enable use of decoders manufactured by multiple venders in a single content distribution system. In accordance with certain embodiments consistent with the present invention, SE is used to access stored content over multiple units of time. By multiple selectively encrypting certain packets as described above, using entitlement keys for current and future time periods (e.g., months) the same CA content may be accessed in the future, whereas normally the content would expire.

To illustrate the concept of certain embodiments of the present invention, consider the data streams depicted in FIG. 1. A clear data stream 104 is shown at the top with packets all assigned a packet identifier PID A. This data stream has packets of content such as packets 112, 116, 120 and 124, 128 and 132. Additional packets may appear in the data stream before, during and after this stream. Certain of the packets are selected for encryption in a manner that makes it difficult or impossible to readily decode the content without paying for it and obtaining an appropriate decryption key. In this example, packets 116 and packets 124 are selected according to a suitable criterion (such as any of those described in the above-referenced patent applications or other suitable packets).

The selected packet 116 is, in this example, duplicated twice to obtain three identical packets. These three identical packets are then mapped to three PIDs—in this example, PID A, PID B, and PID C. The packets are then encrypted using three different encryption keys—one for the current month (month 1), one for next month (month 2) and one for the following month (month 3). The packets are then reinserted into a data stream in the original location of packet 116 as packets 138, 140 and 142. In a similar manner, the selected packet 124 is, in this example, duplicated twice to obtain three identical packets. These three identical packets are then mapped to three PIDs—in this example, PID A, PID B, and PID C. The packets are then encrypted using three different encryption keys—one for the current month (month 1), one for next month (month 2) and one for the following month (month 3). The packets are then reinserted into a data stream in the original location of packet 124 as packets 150, 152 and 154.

When this process is completed for all selected packets, the multiply encrypted file or data stream 160 results. When the packets are appropriately selected, only a small percentage of the overall content is duplicated and multiply encrypted. Thus, only a small increase in bandwidth is used to implement this process, and full retransmissions of the content are unnecessary. Using this technique, in the current example, the content can be enabled for as many as three months with the decoder at the customer's premise simply accessing a different set of encrypted packets corresponding to the currently valid entitlement decryption key. The packets with currently valid encryption keys are identified by the PID associated with the present time period (e.g., month). In this example, three months worth of keys are provided, but this is not to be considered limiting since the time period for a valid key can be any suitable time period and the number of time periods depends simply upon the number of duplicate packets encrypted under different keys that are to be encoded and transmitted.

Figure 2:
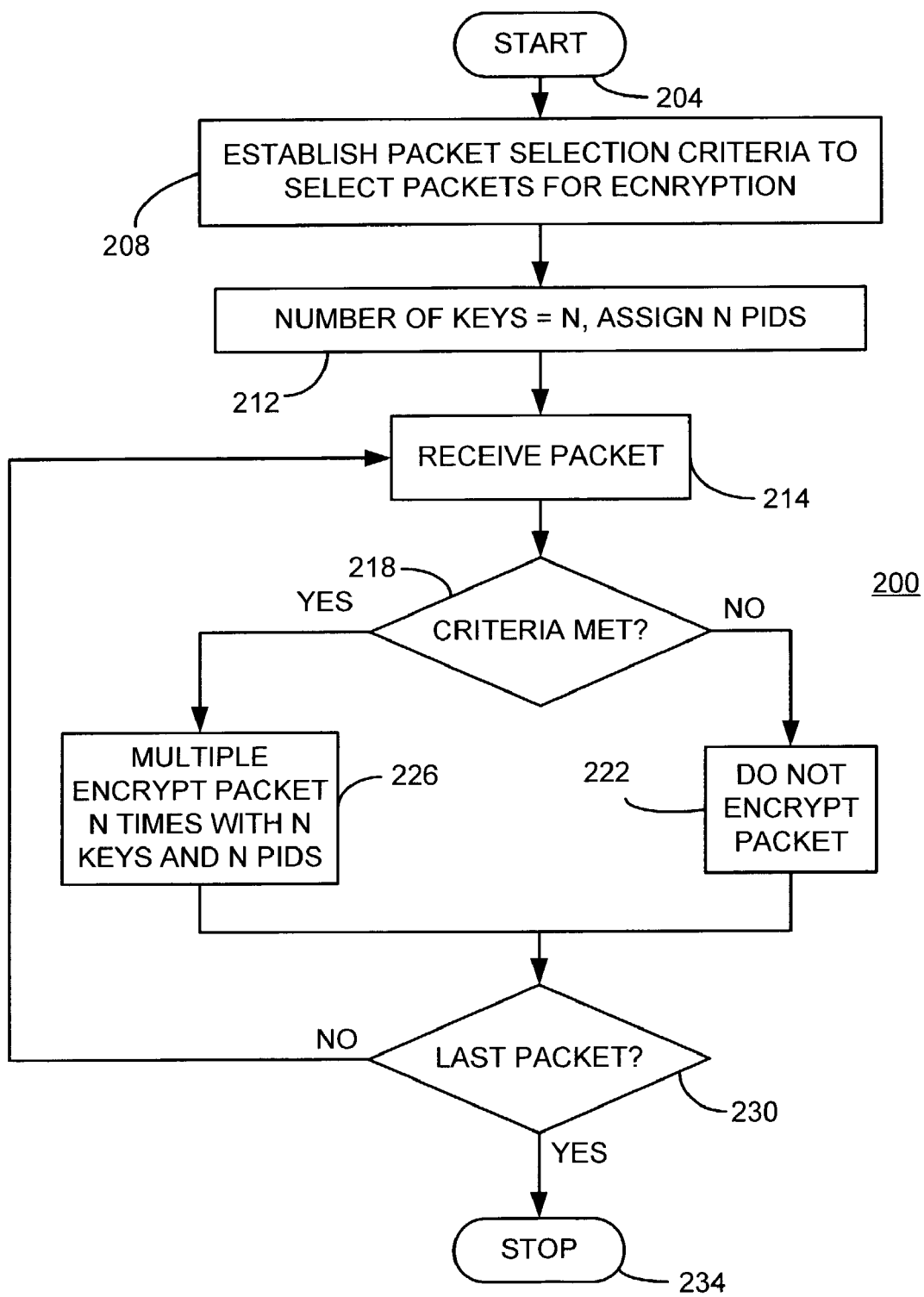
FIG. 2 is a flow chart of an encoding process for selective encryption consistent with certain embodiments of the present invention.

The process for creation of a data stream or file such as that of FIG. 1 is depicted in FIG. 2 as process 200 starting at 204. At 208, the packet selection criterion is established for selection of packets to encrypt (e.g., selection of packets containing slice headers). At 212, the number of keys N is determined in accordance with a number of time periods (e.g., months) for which the content is to remain valid. This number N also corresponds to the number of PIDs that are assigned and the number of duplicate packets that are generated. At 214, a packet is received and at 218 it is determined whether or not the packet meets the packet selection criterion established at 208. If the criterion is not met at 218, the packet is not encrypted at 222. If the criterion is met, the packet is multiply encrypted N times with N keys and identified by N PIDs at 226. This process repeats for each received packet at 214 until the last packet is received at 230, at which point the process stops at 234. In certain embodiments, user private data can be used to convey to the decoder which of the keys is valid during a particular time period.

Thus, in accordance with certain embodiments consistent with the present invention, a method of selectively encrypting digital video content, involves receiving a plurality of unencrypted packets containing the digital video content; selecting certain of the packets of a specified type for encryption according to a selection criterion; encrypting the selected packets using a first encryption key to produce first encrypted packets; encrypting the selected packets using a second encryption key to produce second encrypted packets; and replacing the unencrypted packets of the specified packet type with the first encrypted packets and the second encrypted packets in the digital video signal to produce a partially dual encrypted video signal. The first encryption key can be valid for a first time segment and the second encryption key can be valid for a subsequent time segment. The packets encrypted under the first and second encryption keys can be identified by first and second packet identifiers (PIDs). One of the first and second PIDs can also identify the unencrypted packets.

Figure 3:
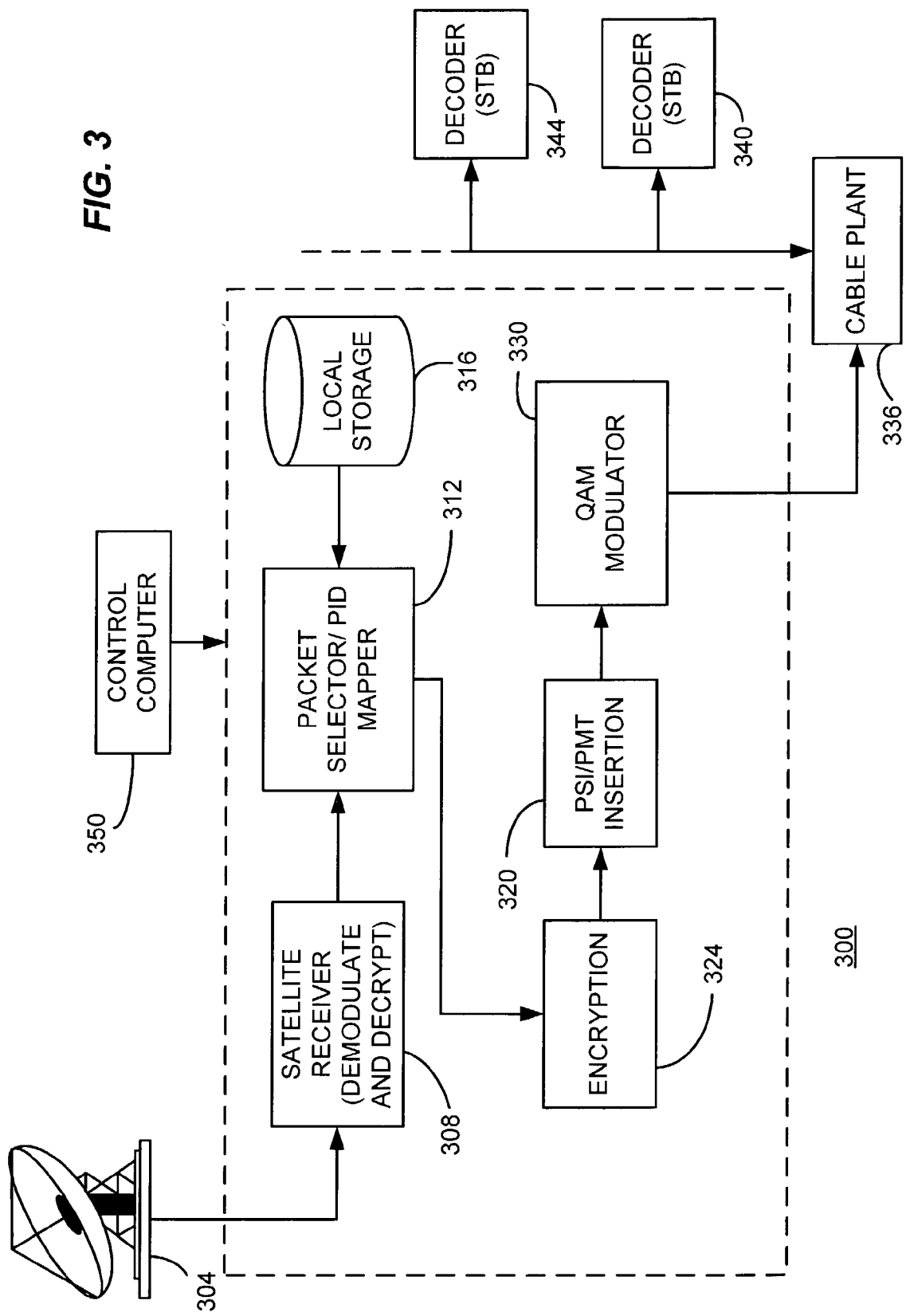
FIG. 3 illustrates a cable television system consistent with certain embodiments of the present invention

Referring now to FIG. 3, an exemplary cable system is depicted as 300. In this system, a satellite antenna 304 receives a multiplexed stream of content from a satellite transmission such as a HITS™ (Headend In The Sky) feed. The received stream of content is received, demodulated and decrypted at a satellite receiver 308 and the content is passed along to a packet selector/PID mapper 312, the function of which will become clear in view of discussions to follow. Appropriate keys for use in the multiple encryption process and/or other content may be retrieved from a local storage 316. The packet selector/PID mapper selects appropriate packets for encryption and maps the incoming content from whatever source to a set of main PIDs for the unencrypted packets (and possibly one set of the encrypted packets) and a set of secondary or shadow PIDs for one or more sets of the duplicated packets.

The content then passes to encrypter 324 for encryption of the multiply duplicated packets under a plurality of encryption keys (one for each time period for which the content is to be accessible. A PSI/PMT inserter 320 then inserts Program Specific Information (PSI) and Program Map Tables (PMT) into the stream of content for use by the decoding side in decoding the programming The content is then modulated at a modulator (such as a QAM modulator) 330. The modulated stream of content is then transmitted via the cable plant 336 to the end users with decoder boxes such as Set-top boxes 340 and 344. The operation of the cable head end, including but not limited to the PID mapping and encryption can be carried out under control of a control computer 350.

Such a system can be used to form a selective encryption having a packet identifier that identifies packets of a specified packet type. A packet duplicator duplicates the identified packets to produce first and second sets of the identified packets. A first encrypter encrypts the selected packets using a first and second encryption key. A packet identifier (PID) mapper identifies the packets encrypted under the first and second encryption keys by first and second packet identifiers (PIDs). One of the first and second PIDs can also identify the unencrypted packets. The first encryption key can be valid for a first time period and the second encryption key can be valid for a second time period.

Figure 4:
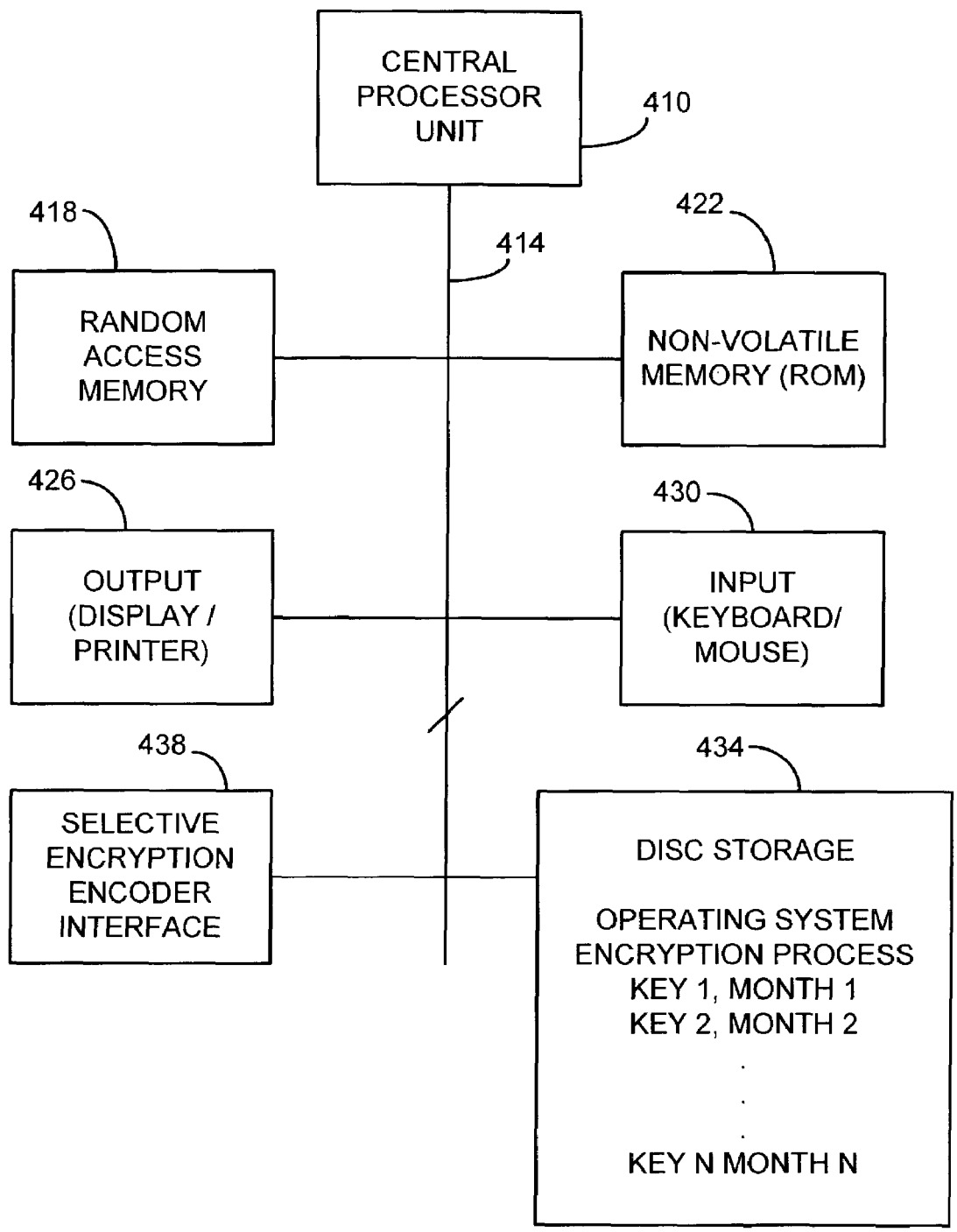
FIG. 4 is a programmed processor which can be used to implement the process of FIG. 2 in a manner consistent with certain embodiments of the present invention.

The processes described above can be carried out on or under the control of any suitable programmed general purpose processor operating as a server/encoder such as that depicted as computer 400 of FIG. 4. Computer 400 can represent control computer 350 or an encryption processor, depending upon programming. Computer 400 has one or more central processor units (CPU) 410 with one or more associated buses 414 used to connect the central processor unit 410 to Random Access Memory 418 and Non-Volatile Memory 422 in a known manner. Output devices 426, such as a display and printer, may be provided in order to display and/or print output for the use of the MSO or user as well as to provide a user interface such as a Graphical User Interface (GUI). Similarly, input devices such as keyboard, mouse and removable media readers 430 may be provided for the input of information by the operator. Computer 400 also may incorporate internal and/or external attached disc or other mass storage 434 (e.g., disc and/or optical storage) for storing large amounts of information including, but not limited to, the operating system, encryption processes (for the encryption encoder), and keys for several time periods-current and future. The Computer system 400 also has an interface 438 for connection to the cable system or a selective encryption encoder. While depicted as a single computer, the digital content provider may utilize multiple linked computers to carry out the functions described herein.

Figure 5:
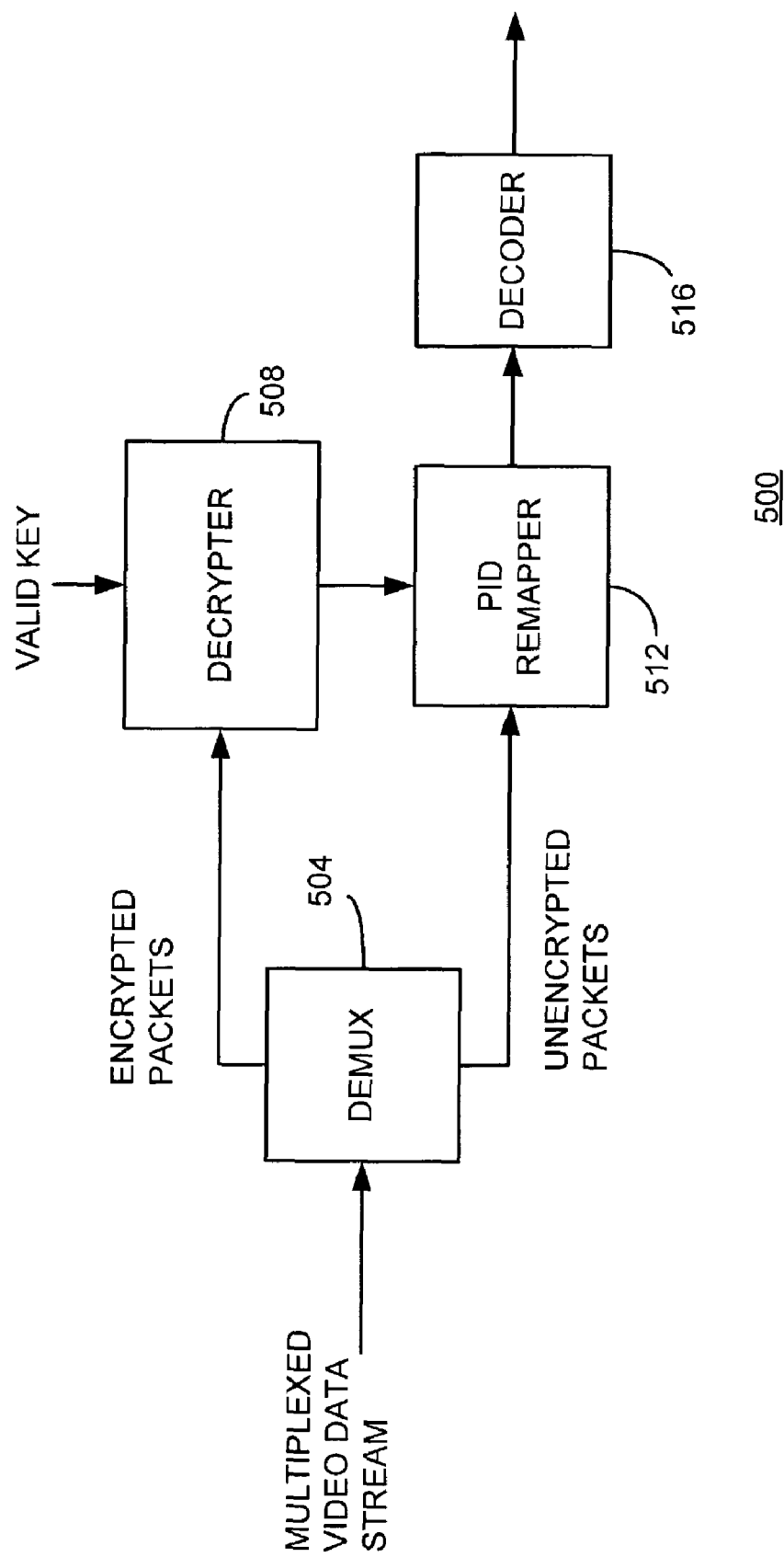
FIG. 5 illustrates a television Set-top box decoder consistent with certain embodiments of the present invention.

An authorized decoder or set-top box such as 500 illustrated in FIG. 5 operating under the secondary CA system decrypts and decodes the incoming program by recognizing both primary and secondary PIDs associated with a single program encrypted with multiple keys. The multiplexed video data stream containing both PIDs is directed to a demultiplexer 504. When a program is received that contains encrypted content that was encrypted by a valid encryption key, the demultiplexer directs encrypted packets containing encrypted content to a decrypter 508. These packets are then decrypted at 508 and passed to a PID remapper 512. As illustrated, the PID remapper 512 receives packets that are unencrypted and bear the primary PID as well as the decrypted packets, possibly having the secondary PID. The PID remapper 512 combines the decrypted packets from decrypter 508 with the unencrypted packets having the primary PID to produce an unencrypted data stream representing the desired program. PID remapping is used to change either the primary or secondary PID or both to a single PID. This unencrypted data stream can then be decoded normally by decoder 516. Some or all of the components depicted in FIG. 5 can be implemented as program code running on a programmed processor running code stored on an electronic storage medium, and may form part of a television Set-top box or other television receiver.

Thus, in accordance with certain embodiments of a selective encryption decoder consistent with the invention, for decrypting and decoding selectively encrypted digital video content, a demultiplexer receives packets of digital video, certain of the packets being unencrypted and certain of the packets being encrypted under a first encryption key and certain of the packets being encrypted under a second encryption key. A determination is made as to whether or not the content contains a currently valid encryption key. A decrypter receives the encrypted packets having the valid encryption key and decrypts the encrypted packets using a valid decryption key to produce decrypted packets. A decoder decodes the unencrypted and decrypted packets to produce a decoded video signal. The packets encrypted under the first and second encryption keys can be identified by first and second packet identifiers (PIDs), and the packet identifier can be used in conjunction with information read from user private data to determine which PID corresponds to the currently valid key.

Figure 6:
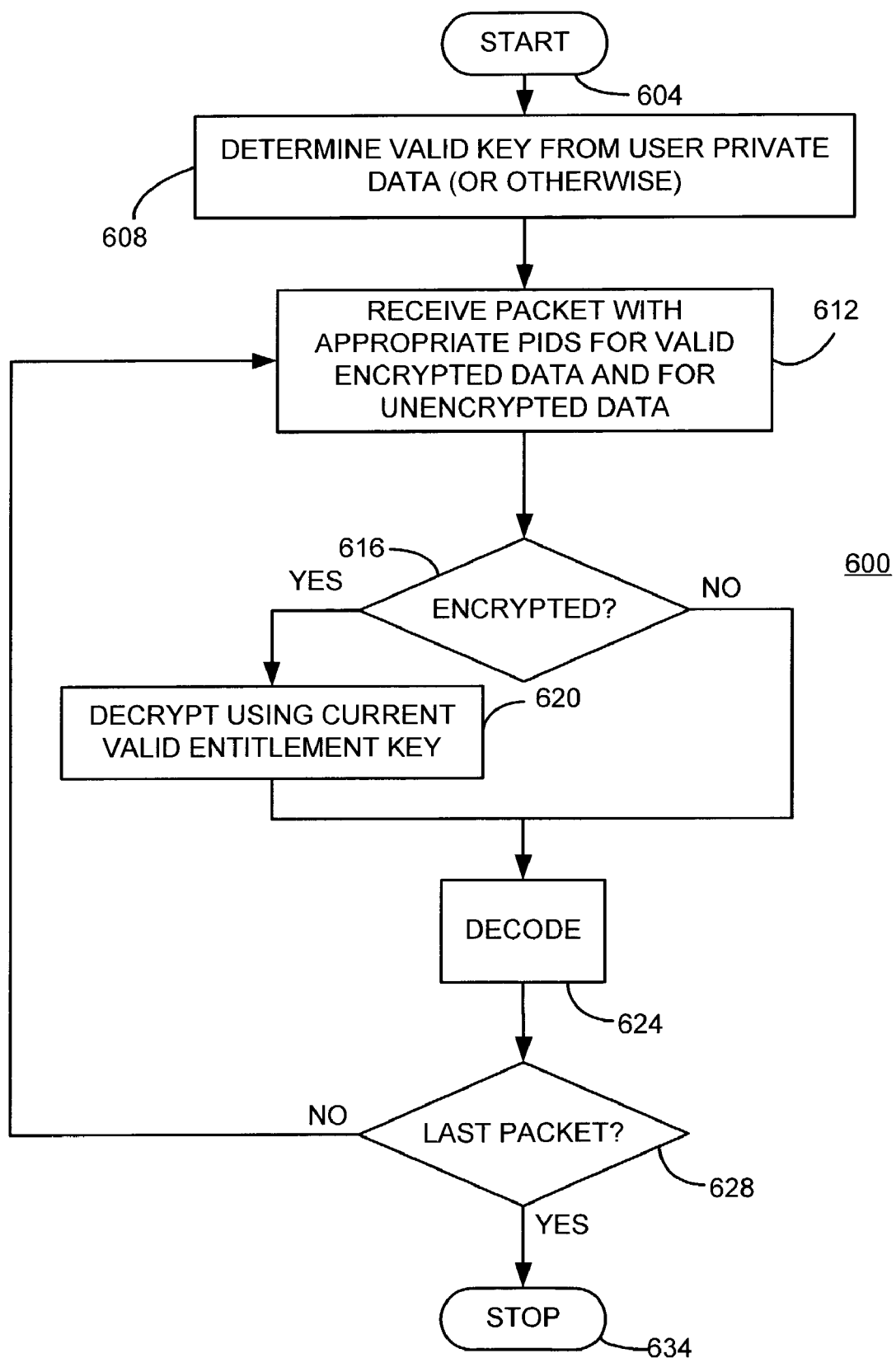
FIG. 6 is a flow chart of operation of a decoder consistent with certain embodiments of the present invention.

A process suitable for use by a decoder consistent with certain embodiments of the present invention is illustrated as process 600 of FIG. 6, starting at 604. At 608, the process determines which key is currently valid. This can be accomplished by reading user private data in the program specific data associated with the program, for example, to determine a PID associated with the current time period and entitlement key. Packets are then received at 612 and demultiplexed to obtain packets with unencrypted data as well as encrypted packets encrypted under the currently valid encryption key. If the data is encrypted at 616, it is passed to a decrypter and is decrypted at 620. Unencrypted and decrypted data are then decoded at 624 until a last packet is received at 628, at which point the process stops at 634.

Thus, a method of decrypting and decoding selectively encrypted digital video content, consistent with certain embodiments of the present invention involves receiving packets of digital video, certain of the packets being unencrypted and certain of the packets being encrypted, wherein certain of the encrypted packets carry data encrypted under a first encryption key and certain other packets carry information encrypted under a second encryption key; determining which of the encrypted packets are encrypted under a currently valid encryption key; decrypting the encrypted packets having the currently valid encryption key; and decoding the unencrypted and decrypted packets to produce a decoded video signal. The packets encrypted under the first and second encryption keys can be identified by first and second packet identifiers (PIDs). The valid key can be determined in one embodiment by reading user private data that identifies valid time periods for the first and second encryption keys by PIDs. The first encryption key can be valid for a first time period and the second encryption key can be valid for a second time period.

The selective encryption methods and apparatus consistent with the invention thus duplicates selected packets in a file or data stream and multiple encrypts the packets using multiple encryption keys. Each encryption key is valid for a specific segment of time so that changes in entitlement keys used for decryption can be made without negatively impacting a customer's ability to access content that has been paid for.

Those skilled in the art will recognize that the present invention has been described in terms of exemplary embodiments based upon use of a programmed processor (e.g., computer 400). However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention. Moreover, although the present invention has been described in terms of a general purpose personal computer providing a playback mechanism, the playback can be carried on a dedicated machine without departing from the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of selectively encrypting digital video content, comprising;

receiving a plurality of unencrypted packets containing the digital video content;

selecting certain of the packets of a specified type for encryption according to a selection criterion;

encrypting the selected packets using a first encryption key to produce first encrypted packets;

encrypting the selected packets using a second encryption key to produce second encrypted packets;

wherein the selected packets encrypted using the first encryption key and the selected packets encrypted using the second encryption key contain the same digital video content;

replacing the unencrypted packets of the specified packet type with the first encrypted packets and the second encrypted packets in the digital video signal to produce a partially dual encrypted video signal comprised of unencrypted packets along with first and second encrypted packets;

wherein the first encryption key is valid for a first segment of time and the second encryption key is valid for a subsequent time segment; and transmitting the partially dual encrypted video signal to a receiver.

2. The method according to claim 1, wherein the first encryption key is valid for a first month and the second encryption key is valid for a subsequent month.

3. The method according to claim 1, wherein the packets encrypted under the first and second encryption keys are identified by first and second packet identifiers (PIDs).

4. The method according to claim 3, wherein one of the first and second PIDs also identify the unencrypted packets.

5. The method according to claim 3, further comprising generating MPEG user private data that identifies valid time periods for the first and second encryption keys by PIDs.

6. The method according to claim 1, wherein The method according to claim 1, further comprising storing the selectively encrypted digital video content on an electronic storage medium.

7. The method according to claim 1, carried out on a programmed processor.

8. A tangible computer readable storage medium storing instructions that, when executed on a programmed processor, carry out the method of selectively encrypting digital video content according to claim 1.

9. The tangible computer readable storage medium of claim 8, wherein the medium comprises an electronic storage medium.

10. A method of decrypting and decoding dual selectively encrypted digital video content, comprising:

receiving partially dual encrypted video content comprising unencrypted packets along with first encrypted packets and second encrypted packets, wherein the first encrypted packets carry data encrypted under a first encryption, key and the second encrypted packets carry data encrypted under a second encryption key;

wherein the first encrypted packets and the second encrypted packets contain the same digital video content;

wherein the first encryption key is valid for a first period of time and the second encryption key is valid for a second period of time;

determining which of the encrypted packets are encrypted under a currently valid encryption key;

decrypting the encrypted packets having the currently valid encryption key; and decoding the unencrypted and decrypted packets to produce a decoded video signal.

11. The method according to claim 10, wherein the packets encrypted under the first and second encryption keys are identified by first and second program identifiers (PIDs).

12. The method according to claim 11, wherein one of the first and second PIDs also identify the unencrypted packets.

13. The method according to claim 11, wherein the determining comprises reading user private data that identifies valid time periods for the first and second encryption keys by PIDs.

14. The method according to claim 10, wherein the first encryption key is valid for a first month and the second encryption key is valid for a second month.

15. The method according to claim 10, carried out on a programmed processor.

16. A tangible computer readable storage medium storing instructions that, when executed on a programmed processor, carry out the method of decoding selectively encrypted digital video content according to claim 10.

17. The tangible computer readable storage medium of claim 16, wherein the medium comprises an electronic storage medium.

18. A selective encryption decoder, for decrypting and decoding selectively encrypted digital video content, comprising:

a demultiplexer that receives dual selectively encrypted video content comprising unencrypted packets along with first encrypted packets and second encrypted packets, wherein the first encrypted packets carry data encrypted under a first encryption key and the second encrypted packets carry data encrypted under a second encryption key;

wherein the first encrypted packets and tile second encrypted packets contain the same digital video content;

wherein the first encryption key is valid for a first period of time and the second encryption key is valid for a second period of time;

means for determining which of the first and second encryption keys are currently valid;

a decrypter receiving the encrypted packets having the valid encryption key and decrypting the encrypted packets using a valid decryption key to produce decrypted packets; and a decoder that decodes the unencrypted and decrypted packets to produce a decoded video signal.

19. The decoder according to claim 18, wherein the packets encrypted under the first and second encryption keys are identified by first and second packet identifiers (PIDs).

20. The decoder according to claim 19, wherein one of the first and second PIDs also identify the unencrypted packets.

21. The decoder according to claim 19, wherein the means for determining comprises means for reading user private data that identifies valid time periods for the first and second encryption keys by PIDs.

22. The decoder according to claim 18, wherein the first encryption key is valid for a first month and the second encryption key is valid for a second month.

23. The decoder according to claim 18, wherein the selectively encrypted digital video content is stored on an electronic storage medium.

24. The decoder according to claim 18, wherein the selectively encrypted digital video content is received from a content provider.

25. The decoder according to claim 18, wherein the decoder forms a part of a television Set-top box.

26. The decoder according to claim 18, implemented using a programmed processor.

27. A selective encryption encoder, comprising:

a packet identifier that identifies packets of a specified packet type;

a packet duplicator that duplicates the identified packets to produce first and second sets of the identified packets in which the first and second identified packets contain the same digital video content;

a first encrypter for encrypting the first set of identified packets using a first encryption key and for encrypting the second set of identified packets using a second encryption key, wherein the first encryption key is valid for a first time period and the second encryption key is valid for a second time period, to produce a dual selectively encrypted signal in which the first and second identified packets contain the same digital video content: and a transmitter that transmits the selectively encrypted signal to a recipient.

28. The encoder according to claim 27, further comprising a program identifier (PID) mapper, and wherein the PID mapper identifies the packets encrypted under the first and second encryption keys by first and second packet identifiers (PIDs).

29. The encoder according to claim 28, wherein one of the first and second PIDs also identify the unencrypted packets.

30. The encoder according to claim 28, further comprising a program specific information inserter that identifies valid time periods for the first and second encryption keys by PIDs.

31. The encoder according to claim 27, wherein the first encryption key is valid for a first month and the second encryption key is valid for a second month.

32. The encoder according to claim 27, further comprising an electronic storage medium, and wherein the selectively encrypted digital video content is stored on the electronic storage medium.

33. The encoder according to claim 27, further comprising a transmitter, and wherein the selectively encrypted digital video content is transmitted from the transmitter to a receiver.

34. The encoder according to claim 27, residing at a cable system head end.

35. The encoder according to claim 27, implemented using a programmed processor.

36. A television set-top box comprising:

a receiver receiving a dual selectively encrypted digital television signal comprising:

unencrypted packets along with first encrypted packets and second encrypted packets, wherein the first encrypted packets carry data encrypted under a first encryption key and the second encrypted packets carry data encrypted under a second encryption key;

wherein the first encrypted packets and the second encrypted packets contain the same digital video content;

wherein the first encryption key is valid for a first period of time and the second encryption key is valid for a second period of time;

means for determining which of the first and second keys is valid;

a decrypter that decrypts the encrypted packets using a valid decryption key; and a decoder that decodes the unencrypted packets and the decrypted packets to produce a signal suitable for play on a television set.

37. The television set-top box according to claim 36, further comprising a demultiplexer, and wherein the demultiplexer identifies the packets encrypted under the first and second encryption keys by first and second packet identifiers (PIDs).

38. The television set-top box according to claim 37, wherein the means for determining comprises means for reading user private data that identifies valid time periods for the first and second encryption keys by PIDs.

39. The television set-top box according to claim 36, wherein one of the first and second PIDs also identify the unencrypted packets.

40. The television set-top box according to claim 36, wherein the first encryption key is valid for a first month and the second key is valid for a second month.

41. A tangible computer readable storage medium that carries instructions that when executed on a programmed processor facilitates operation of a video receiver device to decrypt and decode a selectively encoded digital video signal wherein the instructions comprise:

a code segment that controls a demultiplexer that receives partially dual encrypted video content comprising unencrypted packets along with first encrypted packet and second encrypted packets, wherein the first encrypted packets carry data encrypted under first encryption key and the second encrypted packets carry data encrypted under a second encryption key;

wherein the first encrypted packets and the second encrypted packets contain the same digital video content:

wherein the first encryption key is valid for a first period of time and the second encryption key is valid for a second period of time;

a code segment that determines which of the first and second keys are valid;

a code segment that controls decryption of the encrypted packets under the valid key to produce decrypted packets; and a code segment that controls decoding the unencrypted and decrypted packets to produce a decoded video signal.

42. The tangible computer readable storage medium according to claim 41, further comprising a code segment that controls remapping at least one of the first and second encrypted packets to a packet identifier PD so that the unencrypted packets and the decrypted packets have a same PID.

43. The tangible computer readable storage medium according to claim 41, further comprising a segment of code that generates user private data that identifies valid time periods for the first and second encryption keys by PIDs.

44. The tangible computer readable storage medium of claim 41, wherein the medium comprises one of an electronic storage medium and a carrier wave.

* * * * *

UNITED STATES PATENT AND TRADEMARK OFFICE
CERTIFICATE OF CORRECTION

| | | |
|---|---|---|
| PATENT NO. | : 7,233,669 B2 | Page 1 of 1 |
| APPLICATION NO. | : 10/319169 | |
| DATED | : June 19, 2007 | |
| INVENTOR(S) | : Brant L. Candelore | |

It is certified that error appears in the above-identified patent and that said Letters Patent is hereby corrected as shown below:

In col. 1, after section titled "Cross Reference To Related Documents" and before the paragraph titled "Field of Invention", insert the following paragraph:

--COPYRIGHT NOTICE
A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.--

In col. 5, line 66, before "having" insert -- encoder -- therefor.

Claims:

In col. 9, line 51, after "encryption" delete ",".

In col. 10, line 29, delete "tile" and insert -- the -- therefor.

Signed and Sealed this

Eighteenth Day of September, 2007

JON W. DUDAS
*Director of the United States Patent and Trademark Office*